P. BERNARD.
HOG WATERER.
APPLICATION FILED APR. 19, 1913.

1,130,662.

Patented Mar. 2, 1915.
2 SHEETS—SHEET 1.

WITNESSES

INVENTOR
Philip Bernard
BY
ATTORNEY

P. BERNARD.
HOG WATERER.
APPLICATION FILED APR. 19, 1913.
1,130,662.
Patented Mar. 2, 1915.
2 SHEETS—SHEET 2.
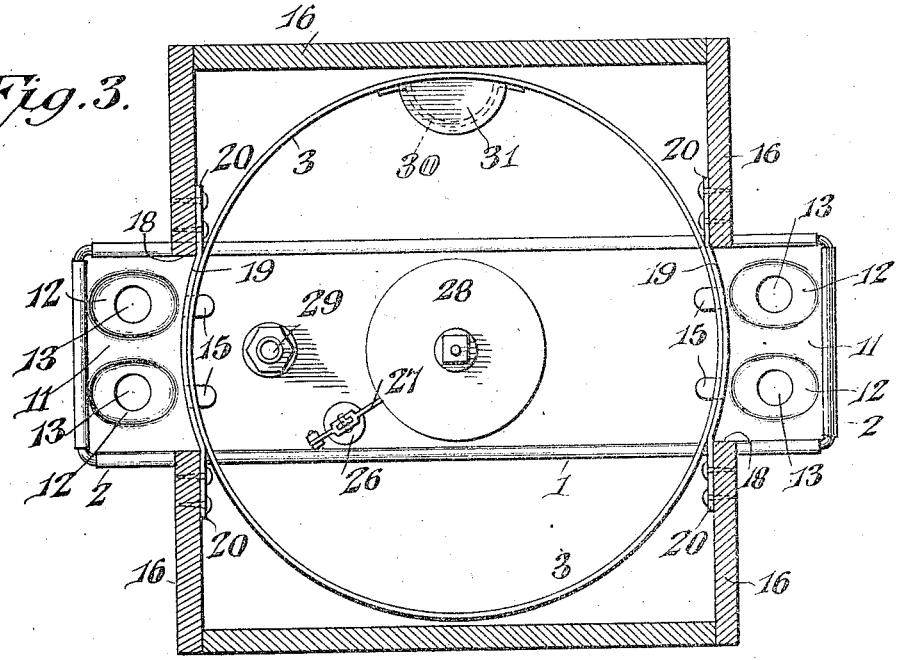
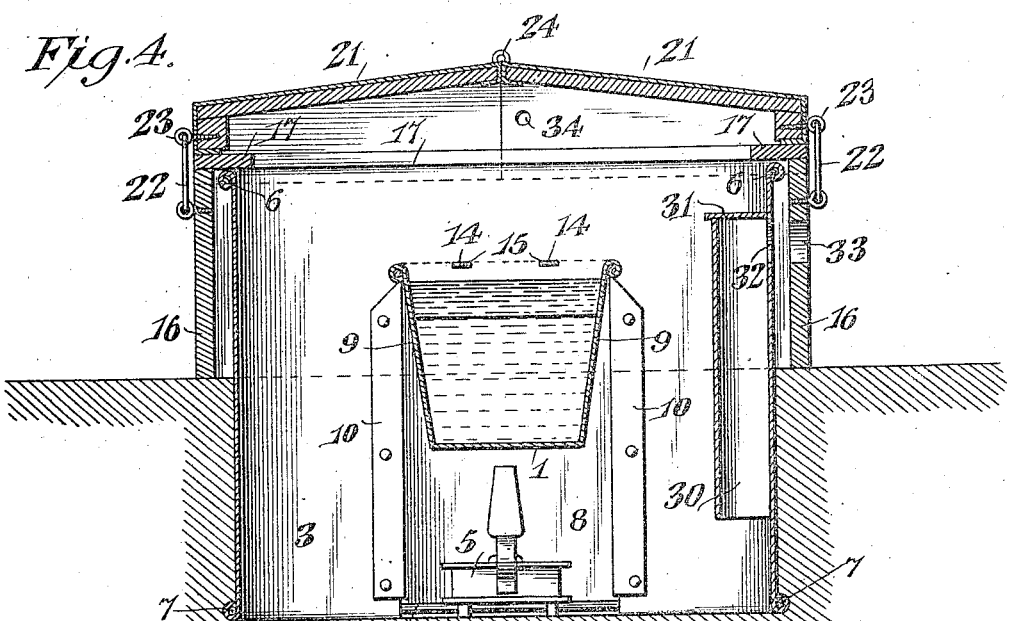
WITNESSES
Jas. F. McCathran
H. F. Riley
Philip Bernard, INVENTOR
BY C. G. Giggers
ATTORNEY

UNITED STATES PATENT OFFICE.

PHILIP BERNARD, OF SIOUX CITY, IOWA.

HOG-WATERER.

1,130,662. Specification of Letters Patent. Patented Mar. 2, 1915.

Application filed April 19, 1913. Serial No. 762,427.

*To all whom it may concern:*

Be it known that I, PHILIP BERNARD, a citizen of the United States, residing at Sioux City, in the county of Woodbury and State of Iowa, have invented a new and useful Hog-Waterer, of which the following is a specification.

The invention relates to improvements in automatic watering troughs.

The object of the present invention is to improve the construction of automatic watering troughs, more especially that shown and described in Patent No. 1,041,412, granted to me Oct. 15, 1912, and to lessen the cost of construction and increase the efficiency and watering capacity of the trough and afford more convenient access to the heating lamps without providing side doors.

Another object of the invention is to provide an automatic trough of this character in which the water will flow directly from the inlet valve to the drinking troughs and which will be equipped with means for preventing hogs from wallowing in or stirring the water contained in the troughs, whereby the latter will remain clear and be maintaned in a sanitary condition.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
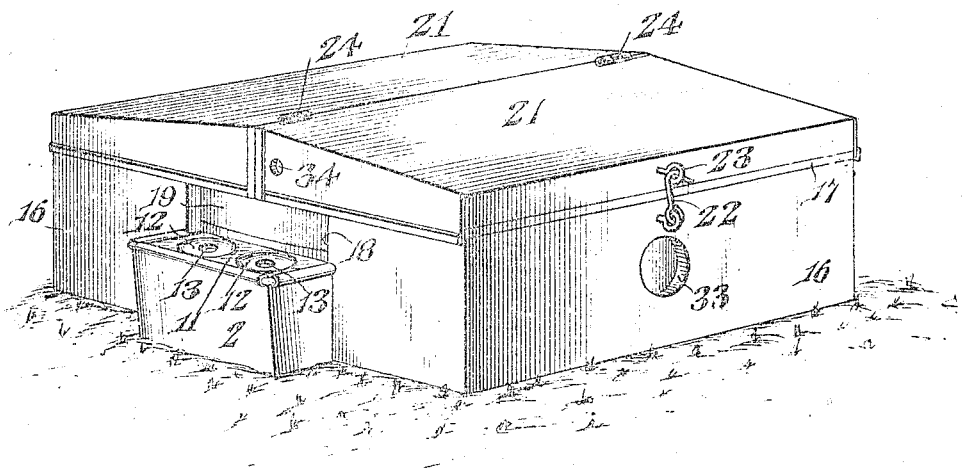
Figure 2:
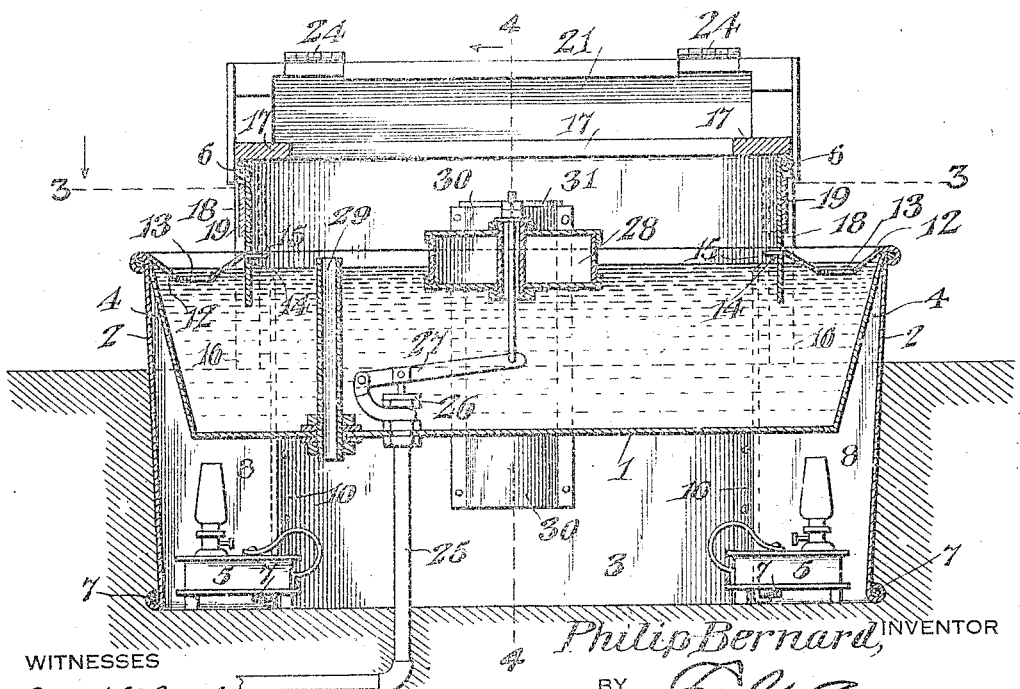

In the drawings:—Figure 1 is a perspective view of a hog waterer, constructed in accordance with this invention. Fig. 2 is a central vertical sectional view of the same, taken longitudinally of the tank. Fig. 3 is a horizontal sectional view on the line 3—3 of Fig. 2. Fig. 4 is a vertical sectional view on the line 4—4 of Fig. 2, parts being omitted.

Like numerals of reference designate corresponding parts in all the figures of the drawings.

In the accompanying drawings in which is illustrated the preferred embodiment of the invention, 1 designates a substantially oblong tank designed to be constructed of galvanized sheet metal, or other suitable material and having inclined side and end walls, arranged at an angle to side and end walls of extension jackets 2 of a cylindrical casing 3 to form intervening spaces 4 to permit the heat from lamps 5 to circulate around the ends of the tank and prevent the water from freezing therein. The approximately cylindrical casing 3, which is constructed of heavy galvanized iron or other suitable material, is reinforced at its upper and lower edges by rings 6 and 7, constructed of rod metal or other suitable material and arranged in beads, as shown, and the said casing is also provided at opposite sides with openings 8, and it has slots 9 extending upwardly from the openings at opposite sides thereof, as clearly illustrated in Fig. 4 of the drawings. The ends of the tank extend through the openings 8, and the upper portions of the side walls of the tank fit in the said slots 9, the upper edges of the end portions of the tank being united to the said jacket extensions 2 at the upper edges thereof. The tank is reinforced at the upper edges of its side and end walls by a horizontal oblong frame constructed of rod metal or other suitable material, and the said jackets 2, which constitute supports for the ends of the trough, are connected with the latter below the reinforcing frame. The end walls of the jackets are arranged at a slight inclination, and the side walls, which are vertical, extend through the openings 8 and through the slots 9, and are bent laterally to form attaching flanges 10, which are riveted or otherwise secured to the inner face of the cylindrical casing at opposite sides thereof. The upper and lower edges of the extension jackets are provided with beads and reinforced by the upper and lower rods, and the lower reinforcing rod 7 of the cylindrical casing extends across the lower ends of the openings 8 and brace the cylindrical casing at such point. The end portions of the tank project beyond the sides of the cylindrical casing at the openings 8, and these projecting terminal portions of the tank constitutes drinking troughs and are supported by the extension jackets 2. Each of the ends of the tank is provided with a water protecting plate 11, constructed of cast iron or other suitable material and provided with approximately elliptical depressions 12 and having circular openings 13 at the bottoms of the depressions to afford access to the water contained in the tank. The cast iron plates set within the extensions of the tank and are supported by the same and also by the adjacent portion of the cylindrical casing, which is provided with horizontal slots 14 through which project horizontal lugs 15, formed integral with and extending inwardly from the rear edges of the removable water protecting plates 11. The plates 11 are adapted to prevent hogs from wallowing in the ends of the tank and stirring the water contained within the same, and the water is thereby maintained in a clear and more sanitary condition than when the troughs are unprotected and the animals permitted to wallow in them.

The hog waterer is set in the ground, as clearly indicated in Figs. 2 and 4 of the drawings, and in practice the end portions of the tank, which constitute the drinking troughs, will be arranged at a convenient elevation for hogs to drink from them. The hog waterer may be surrounded by a concrete surface and is designed to be equipped with a rectangular frame 16, constructed of wood or other suitable material and fitted over the upper portion of the casing and adapted to rest upon the ground or other suitable supporting surface. The frame 16 is provided at the upper edges of its walls with horizontal strips 17, which extend inwardly over the adjacent portions of the upper edges of the cylindrical casing. Two of the walls of the wooden frame are provided with openings 18 through which the terminal portions of the tank and the extension sleeves project. These openings preferably extend from the lower edges of the frame to the horizontal strips 17, and the wooden frame is reinforced at the upper portions of the openings by metallic straps or pieces 19, extending across the openings and having their terminal portions 20 secured to the inner faces of the adjacent side walls of the rectangular frame, as clearly illustrated in Fig. 3 of the drawings. The rectangular frame besides protecting the upper portion of the casing and the intermediate portion of the tank is adapted to support a cover 21, composed of two hinged sections and secured upon the frame by hooks 22 and eyes 23, but any other suitable fastening means may, of course, be provided. The sections of the cover 21 are connected at their adjacent edges by hinges 24 and either cover is adapted to be raised to afford access to the interior of the hog waterer.

Water is supplied to the tank by means of a pipe 25, designed to be connected with any suitable source of supply and extending through the bottom of the tank at the intermediate portion thereof and equipped with a suitable float controlled valve 26. The valve is connected with a lever 27 at a point intermediate of the ends thereof, the lever being fulcrumed at one end and connected at its other end with a float 28, adapted to fall and rise as the water is supplied and consumed from the tank and operable to maintain the water at a predetermined level. The depressed portions of the water protecting plates preferably extend slightly below the surface of the water and directly expose the same, as clearly illustrated in Fig. 2 of the drawings, and water from the valve is supplied directly to the troughs or terminal extensions of the tank, so that the hogs may obtain water as rapidly as desired, thereby increasing the watering capacity of the device over stock waterers equipped with a tank and separate troughs connected by pipes with the tank. The tank may be equipped with an overflow pipe 29, piercing the bottom of the tank and suitably secured to the same and extending slightly above the normal water level. The overflow pipe may be employed or omitted as desired.

The lamps 5 are located below the end portions of the tank, and as the intermediate portions of the side walls of the oblong tank are spaced from the cylindrical casing, ample room is afforded for taking care of the lamps 5 or other heating devices without providing side doors in the casing for this purpose. Air is admitted to the interior of the casing to supply oxygen to the lamps to support combustion by means of a vertical conduit 30, consisting of a semitubular or semicylindrical piece of sheet metal or other suitable material, secured at the side edges to the inner face of the cylindrical casing and extending upwardly from a point below the tank to a point slightly above the same and having a closed upper end 31. The cylindrical casing is provided with an air inlet opening 32, communicating with the upper portion of the air conduit 30, which is open at the lower end. The cover supporting frame is also provided with an opening 33, located opposite the inlet opening 32 to permit the air to pass through the said frame into the air conduit. The cover is provided at the end of one of its sections with openings 34 to permit the escape of heated air rising within the hog waterer, and this will cause the necessary circulation of air through the hog waterer.

What is claimed is:—

1. A device of the class described including a casing provided with opposite openings, a tank of a width less than the casing and a length greater than the same and extending across the said casing and projecting through the openings thereof, the terminal portions of the tank forming exterior drinking portions and permitting animals to drink directly from the tank, and exterior extension jackets connected with the casing at opposite sides of the said openings, said jackets being also connected with the terminal portions of the tank and spaced at points therefrom to provide intervening spaces to permit heated air to circulate around the end portions of the said tank.

2. A device of the class described including an approximately cylindrical casing provided at opposite sides with openings, an oblong tank of a width less than the diameter of the casing and of a length greater than the same extending across the casing and having its terminal portions projecting through the said openings to form exterior drinking troughs to permit animals to drink directly from the tank, said tank being arranged above the lower end of the casing to provide spaces for heating devices, and the intermediate portion of the tank being spaced from the walls of the casing to afford access to the space below the tank, and exterior extension jackets connected with the casing at opposite sides of the said openings and with the terminal portions of the tank at the upper edges thereof, said jackets being spaced at points from the end portions of the tank to provide intervening spaces to permit heated air to circulate around the terminal portions of the said tank.

3. A device of the class described including an approximately cylindrical casing constructed of sheet metal and designed to be mounted in the ground with its upper portion projecting therefrom, a rectangular frame fitted over the upper projecting portion of the casing and designed to be arranged above the ground, a tank extending across the casing and projecting through the sides of the same and also through the said frame to provide exterior drinking troughs, and a cover for the casing supported by the said frame.

4. A device of the class described including a casing constructed of sheet metal and provided with opposite openings, a tank extending across the casing and projecting through the said openings to form exterior drinking troughs, a rectangular frame fitted over the upper portion of the casing and provided at opposite sides with openings through which extend the terminal projecting portions of the tank, said casing being extended below the frame and a cover supported by the rectangular frame.

5. A device of the class described including a casing, an exterior drinking trough projecting from the casing, and a water protecting plate arranged over the drinking trough and extending into the same and engaging and removably supported by the walls of the said trough, said plate having an opening.

6. A device of the class described including a casing, an exterior drinking trough projecting from the casing, and a detachable protecting plate covering the projecting drinking trough and having a depression extending into the same below the surface of the water and provided at the bottom with an opening, said plate fitting within the walls of the trough and engaging the same at the upper edges thereof and held by the latter against horizontal movement and removable only by lifting it out of the said trough.

7. A device of the class described including a casing, a tank projecting through the casing and having an exteriorly arranged portion to form a trough to permit animals to drink directly from the tank, and a water protecting plate extending over the projecting portion of the tank and fitting within and supported at the side and end walls of the tank at the upper edges thereof, said plate being provided at the inner edge with lugs projecting through the casing and interlocking the plate therewith.

8. A device of the class described including a substantially cylindrical tank provided at opposite sides with openings and having slots extending upwardly from the openings, an oblong tank extending across the casing and projecting through the openings to form exterior troughs, said tank having its side walls fitting in the slots of the casing, and the latter forming transverse partitions which extend across the tank at spaced points, and exterior jackets connected with the casing at opposite sides of the said opening and secured to the tank at the upper edges thereof, whereby the tank is supported within the casing.

9. A device of the class described including an approximately cylindrical casing provided at opposite sides with openings, an oblong tank of greater length than the diameter of the casing extending across the same and projecting through the openings thereof to form exterior troughs to permit animals to drink directly from the tank, said tank having inclined side and end walls, and extension jackets connected with the casing at the said openings and secured to the projecting portions of the tank, said jackets having walls arranged at an angle to the inclined side and end walls of the tank to form intervening spaces to permit heated air to circulate around the extended ends of the tank.

10. A device of the class described, including a casing, an exterior drinking trough projecting from the casing, and a water protecting plate covering the projecting drinking trough and removably supported within the same by the walls thereof and having a depression extending into the drinking trough and provided with an opening to afford access to the water, said plate being provided at its inner edge with projecting means interlocking the plate with the casing and coacting with the walls of the trough to hold the plate against horizontal movement, whereby the plate is removable only by lifting it out of the trough.

11. A device of the class described including a casing provided at opposite sides with openings, an oblong tank of a width less than the casing extending entirely across the same and projecting through the openings thereof to form exterior drinking troughs, said tank being provided at its upper edge with an oblong reinforcing frame, and extension jackets secured to the casing at opposite sides of the said openings and connected at their upper edges to the tank beneath the said oblong frame and forming supports for the said tank.

12. A device of the class described including a casing provided with an opening and having slots extending upwardly from the opening, a tank arranged within the casing and extending through the opening thereof and having its side walls arranged in the said slots, the portion of the casing between the slots depending within the tank and forming a transverse partition, and a water protecting plate fitting within the projecting portion of the tank and supported by the walls thereof at the upper edges of the same, said plate having projecting means detachably interlocking it with the said depending portion of the casing.

In testimony, that I claim the foregoing as my own, I have hereto affixed my signature in the presence of two witnesses.

PHILIP BERNARD.

Witnesses:
C. A. PATCH,
W. A. DANTHETT.